United States Patent [19]

Derr

[11] Patent Number: 5,397,392
[45] Date of Patent: Mar. 14, 1995

[54] MATERIAL FOR USE AS SOIL STABILIZER AND AS SOIL SUBSTITUTE

[75] Inventor: John D. Derr, Akron, Ohio
[73] Assignee: Wessco, Inc., Norton, Ohio
[21] Appl. No.: 206,739
[22] Filed: Mar. 7, 1994
[51] Int. Cl.6 ............................................. C04B 14/10
[52] U.S. Cl. .................................. 106/486; 106/900; 106/204; 106/902
[58] Field of Search ............... 106/811, 816, 900, 486, 106/902, 803, 805, 204; 501/155, 141; 404/31, 75, 76

[56] References Cited

U.S. PATENT DOCUMENTS

| | | | |
|---|---|---|---|
| 3,082,111 | 3/1963 | Maddison et al. | 106/486 |
| 3,607,339 | 9/1971 | Davies | 106/486 |
| 3,661,604 | 5/1972 | Artmann | 106/721 |
| 4,523,755 | 6/1985 | Turba | 404/31 |
| 4,822,420 | 4/1989 | Burkhardt et al. | 106/900 |
| 4,824,810 | 4/1989 | Lang et al. | 501/155 |
| 5,175,131 | 12/1992 | Lang et al. | 501/84 |
| 5,264,029 | 11/1993 | Kviesitis | 106/900 |

FOREIGN PATENT DOCUMENTS 36644 9/1981 European Pat. Off. .

Primary Examiner—Mark L. Bell
Assistant Examiner—Michael Marcheschi
Attorney, Agent, or Firm—Renner, Kenner, Greive, Bobak, Taylor & Weber

[57] ABSTRACT

A soil substitute material includes from about 2 to about 9 parts by weight of crushed brick; from about 5 to about 25 parts by weight of a filler material; from about 60 to about 90 parts by weight of raw clay; and, from about 0 to about 3 parts by weight of a hydrating material. The material is compacted at from about 3500 to about 5000 pounds per square inch. A method of preparing a soil substitute includes admixing the components with from about 5 to about 18 parts by weight of water and compressing the hydrated mixture at from about 3500 to about 5000 pounds per square inch.

4 Claims, No Drawings

MATERIAL FOR USE AS SOIL STABILIZER AND AS SOIL SUBSTITUTE

TECHNICAL FIELD

This invention relates to a material which is useful for stabilizing soil and for use as a soil substitute. More particularly, the invention relates to a hydrated material which is compacted at high pressure, and which can be used to stabilize soil and as a substitute for soil, wherein it is desired to impede soil erosion. Specifically, the invention relates to a hydrated and compacted mixture of materials including crushed brick, a filler, clay and a hydrating material.

BACKGROUND OF THE INVENTION

In industries relying upon soil as a surface for supporting a given activity, it is often necessary to compact the soil to so that it is firm enough for the intended purpose. For example, in sporting industries, soil is often relied upon as the primary "playing" area and hence, requires a certain amount of care to maintain in a useable condition. Such sports fields include baseball diamonds and particularly, pitcher's mounds and batter's boxes, equestrian fields, sand traps at golf courses and the like. Each area would benefit from highly compacted and hence-durable soil. Soil compaction has been accomplished by various methods, including rolling heavy weights over the surface, impacting a heavy plate onto the surface and by vibration. Compaction by rolling has enjoyed wide-spread use. However, even with large rollers, compacting the soil over at over 1000 pounds per square inch has proven difficult.

It has also been found that some sports field materials are not as durable or useful when the moisture therein is lost. This "drying out" often has a detrimental effect upon the usefulness of the material for its intended purpose.

A need exists therefore, for a durable substitute for soil, which overcomes the problem of compacting soil already on the ground. A need also exists for a material which can be used to stabilize soil already in place, and which is resistant to "drying out".

SUMMARY OF INVENTION

It is therefore, an object of the present invention to provide a material for use in place of soil.

It is another object of the present invention to provide a material for use in place of soil and which is durable.

It is yet another object of the present invention to provide a material for use in stabilizing soil.

It is still another object to provide a method for the preparation of a material for use as a soil substitute.

At least one or more of the foregoing objects, together with the advantages thereof over the known art relating to soil and soil stabilization, which shall become apparent from the specification which follows, are accomplished by the invention as hereinafter described and claimed.

In general the present invention provides a soil substitute material which comprises from about 2 to about 9 parts by weight of crushed brick; from about 5 to about 25 parts by weight of a filler material; from about 60 to about 90 parts by weight of raw clay; and, from about 0 to about 3 parts by weight of a hydrating material. The material is compacted at from about 3500 to about 5000 pounds per square inch.

The present invention also includes a method for preparing a soil substitute which comprises the steps of admixing from about 2 to about 9 parts by weight of crushed brick, from about 5 to about 25 parts by weight of a filler material, from about 60 to about 90 parts by weight of raw clay, and from about 0 to about 3 parts by weight of a hydrating material, to form a dry mix intermediate. The method also includes admixing 100 parts by weight of the dry mix intermediate with from about 5 to about 18 parts by weight of water, to form a hydrated mix; and, compressing the hydrated mix at a pressure of from about 3500 to about 5000 pounds per square inch, to form a compressed mix.

PREFERRED EMBODIMENT FOR CARRYING OUT THE INVENTION

There is provided according to the present invention, a material useful as a soil substitute. By "soil substitute" and similar phrases, it is understood to mean that the material is used in place of and in addition to naturally occurring soil or whatever material is already in place. Hence, the present invention can be used both as a complete substitute, that is, in place of other soil, and it can be used in addition to other soil to stabilize the same. For the sake of this discussion, the term "soil substitute" will be understood to mean any such use.

The invention includes a hydratable, dry mix intermediate. The dry mix intermediate is hydrated to form a hydrated mix, and then compressed at high pressure to form a compressed mix. The compressed mix can then be used as a soil substitute. It will be appreciated that because the compressed mix is already compressed, further compression in the field is not necessary, except to as may be encountered when forming the material into a desired shape or location, such as a pitcher's mound or the like.

The dry mix intermediate includes crushed brick, a filler material, raw clay and a hydrating material. The crushed brick can be any of the commonly known fired brick, including those made of clay, shale, slag, cement, lime and the like, as well as combinations thereof. The brick is pulverized, milled or otherwise crushed to a preferred average particle size of from about 1/64 to about ⅛ of an inch. Such crushed brick, which is used in other applications removed from that of the present invention, is sometimes referred to as "grog". It is to be understood that the average particle size of the grog is not necessarily a limitation of the invention, and sizes outside of the range discussed above is within the scope of the invention.

The filler material may include any commonly known materials useful for the invention. One preferred filler material is sawdust. Other fillers useful in the invention include other cellulose materials such as grain hulls, silicas, calcium carbonate, soft clays, soft flour, and the like.

The clay material useful in the invention includes any of the common clays, including for example, fire clays, ball clays, shale clays, and other clays, including silica components and the like. It is further preferred that the clay be "raw" or non-fired.

Mother component of the invention material is a hydrating material. Any material which will promote hydration is within the scope of the invention. The hydrating material should promote hydration of the material such that a degree of elasticity is imparted thereto. It will be appreciated by one skilled in the art that the hydrated material will be more pliable than the non-hydrated material. Hence, the hydrating material may also be said to "plasticize" the invention material.

Further, the hydrating material is optional in the present invention. If the end use of the invention is such that the material will be kept moist, such as in an application where surrounding foliage is watered, then a hydrating material might no be necessary. In applications where no water will likely be applied, such as when it is used with an indoor sports field employing artificial turf, a hydrating component will keep the invention material moist and compacted.

One preferred hydrating material is hydroxypropyl methylcellulose, which is commercially available from Dow Chemical as Methocel. Other hydrating materials include other cellulose materials, clays such as aluminum silicate colloidal clays, also known as "bentonite", and the like.

Other materials such as stabilizers, processing aids and the like can be added to the present invention material without departing from the scope of the invention.

The dry mix intermediate ingredients are admixed in any conventional manner. The dry mix is then hydrated. The actual amount of hydration will vary depending upon the end use of the material. One preferred amount of hydration includes mixing 100 parts by weight of the dry mix intermediate with from about 5 to about 18 parts by weight of water. This mixture forms the hydrated mix which may be prepared again, in any conventional manner.

The hydrated mix is then compressed under high pressure. It is preferred to extrude the hydrated mix, but any method of compaction is within the scope of the invention.

Preferably, the hydrated mix is extruded at so as to compact the material at from about 3500 to about 5000 pounds per square inch. The material may be extruded into relatively large slabs. By "slab" it meant that a large section of the material is extruded. The slab need have no particular shape or dimension, and its size will likely be limited by the extrusion equipment employed. The purpose of the slab is to allow larger portions if the invention material to be easily handled. This would be useful in transporting large amounts of the material to a playing field. When preparing a pitching mound for example, the slabs of material can be built up and "molded" in place in the proper shape of the mound.

It is also possible to chop, grind or otherwise form the invention material into smaller particles. Such would be useful for transporting and handling smaller amounts of the material. Also, if a playing surface becomes damaged, the damaged portion need only be superficially cleaned, wetted and then an amount of the particularized invention material spread in the damaged area. The material would then be tamped down in any conventional manner.

Again it should be noted that because the invention material is already compressed at from about 3500 to about 5000 pounds per square inch, further compression at the playing field, other than for molding and shaping purposes if required, is unnecessary.

The material may thus be used in place of natural soil, that is, in place of natural soil in the formation of a pitcher's mound, a batter's box or the like. It may also be used as a soil stabilizer in for example, a layer of the invention material being used to line a sand trap or the like. The soil beneath the invention material layer would be stabilized by the strength of the invention material layer. Again, all such uses are encompassed herein by the terms "soil substitute" and the like.

To exemplify the present invention, a dry mix was prepared by combining 79 parts by weights of fire clay, 15 parts by weight of sawdust, 5 parts by weight of crushed fire brick, and 1 part by weight of Methocel. The dry mix is hydrated with about 5 to about 18 parts by weight of water for every 100 parts by weight of the dry mix, to form the hydrated mix.

The hydrated mix is then extruded at about 5000 pounds per square inch, and formed into slabs, pellets or other suitable shapes. The slabs have an average size of about $42 \times 12 \times 8$ inches, and the pellets have an average size of about $\frac{1}{8}$ to about 8 inches. It is appreciated that the hydrated mix could be formed without the hydrating component, and extruded at high pressures.

Slabs and pellets thus prepared have been used to form and repair pitcher's mounds and batter's boxes. The material has proven effective, and even after drying out, can be rehydrated by simply pouring water over it.

Thus it is evident that the material and method of the present invention are highly effective in providing a soil substitute. The invention is particularly suited for sports fields, but is not necessarily limited thereto. The material and method of the present invention can be used separately with other equipment, methods and the like, as well as for the manufacture of other materials such as may be useful in construction and building industries and the like.

Based upon the foregoing disclosure, it is now apparent that the use of the invention soil substitute material described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, for example, the exact nature of the crushed brick, the filler, the raw clay employed and the hydrating component, as well as actual particle sizes thereof, according to the present invention are not necessarily limited to those specifically discussed. Thus, the scope of the invention shall include all modifications and variations that may fall within the scope of the attached claims.

What is claimed is:

1. A soil substitute material consisting essentially of:
    from about 2 to about 9 parts by weight of crushed fired brick;
    from about 5 to about 25 parts by weight of a filler material comprising sawdust, grain hulls, silica or calcium carbonate;
    from about 60 to about 90 parts by weight of raw clay; and,
    from about 0 to about 3 parts by weight of cellulose;
    wherein the material is highly compact by being compacted at from about 3500 to about 5000 pounds per square inch.

2. A soil substitute material, as set forth in claim 1, wherein said crushed fired brick has an average particle size of from about 1/64 to about $\frac{1}{8}$ inch.

3. A soil substitute material, as set forth in claim 1, wherein said raw clay is selected from the group consisting of ball clay, and fire clay.

4. A soil substitute material, as set forth in claim 1, wherein said cellulose material is hydroxypropyl methylcellulose.

* * * * *